(12) United States Patent
Sauermann et al.

(10) Patent No.: US 8,880,811 B2
(45) Date of Patent: Nov. 4, 2014

(54) DATA PROCESSING DEVICE AND DATA PROCESSING ARRANGEMENT FOR ACCELERATING BUFFER SYNCHRONIZATION

(75) Inventors: Mirko Sauermann, Neubiberg (DE); Alexander Schackow, Grafing (DE); Cyprian Grassmann, Deisenhofen (DE); Ulrich Hachmann, Neubiberg (DE); Ronalf Kramer, Oberbiberg (DE); Dominik Langen, Brunnthal (DE); Wolfgang Raab, Munich (DE)

(73) Assignee: Intel Mobile Communications GmbH, Neubiberg (DE)

( * ) Notice: Subject to any disclaimer, the term of this patent is extended or adjusted under 35 U.S.C. 154(b) by 489 days.

(21) Appl. No.: 13/169,128

(22) Filed: Jun. 27, 2011

(65) Prior Publication Data

US 2012/0331240 A1    Dec. 27, 2012

(51) Int. Cl.
*G06F 12/00* (2006.01)
*G06F 15/167* (2006.01)

(52) U.S. Cl.
CPC .................................. *G06F 15/167* (2013.01)
USPC .................................. 711/148; 711/E12.001

(58) Field of Classification Search
None
See application file for complete search history.

(56) References Cited

U.S. PATENT DOCUMENTS

| | | | |
|---|---|---|---|
| 8,286,188 B1* | 10/2012 | Brief | 719/312 |
| 2004/0107265 A1* | 6/2004 | Yasunaga | 709/213 |
| 2006/0242257 A1* | 10/2006 | Kuribayashi | 709/214 |
| 2006/0248218 A1* | 11/2006 | Kuribayashi | 709/232 |

* cited by examiner

*Primary Examiner* — Kevin Verbrugge

(57) ABSTRACT

A data processing device is described with a memory and a first and a second data processing component. The first data processing component comprises a control memory comprising, for each memory region of a plurality of memory regions of the memory, an indication whether a data access to the memory region may be carried out by the first data processing component and a data access circuit configured to carry out a data access to a memory region of the plurality of memory regions if a data access to the memory region may be carried out by the first data processing component; and a setting circuit configured to set the indication for a memory region to indicate that a data access to the memory region may not be carried out by the first data processing component in response to the completion of a data access of the first data processing component to the memory region.

18 Claims, 8 Drawing Sheets

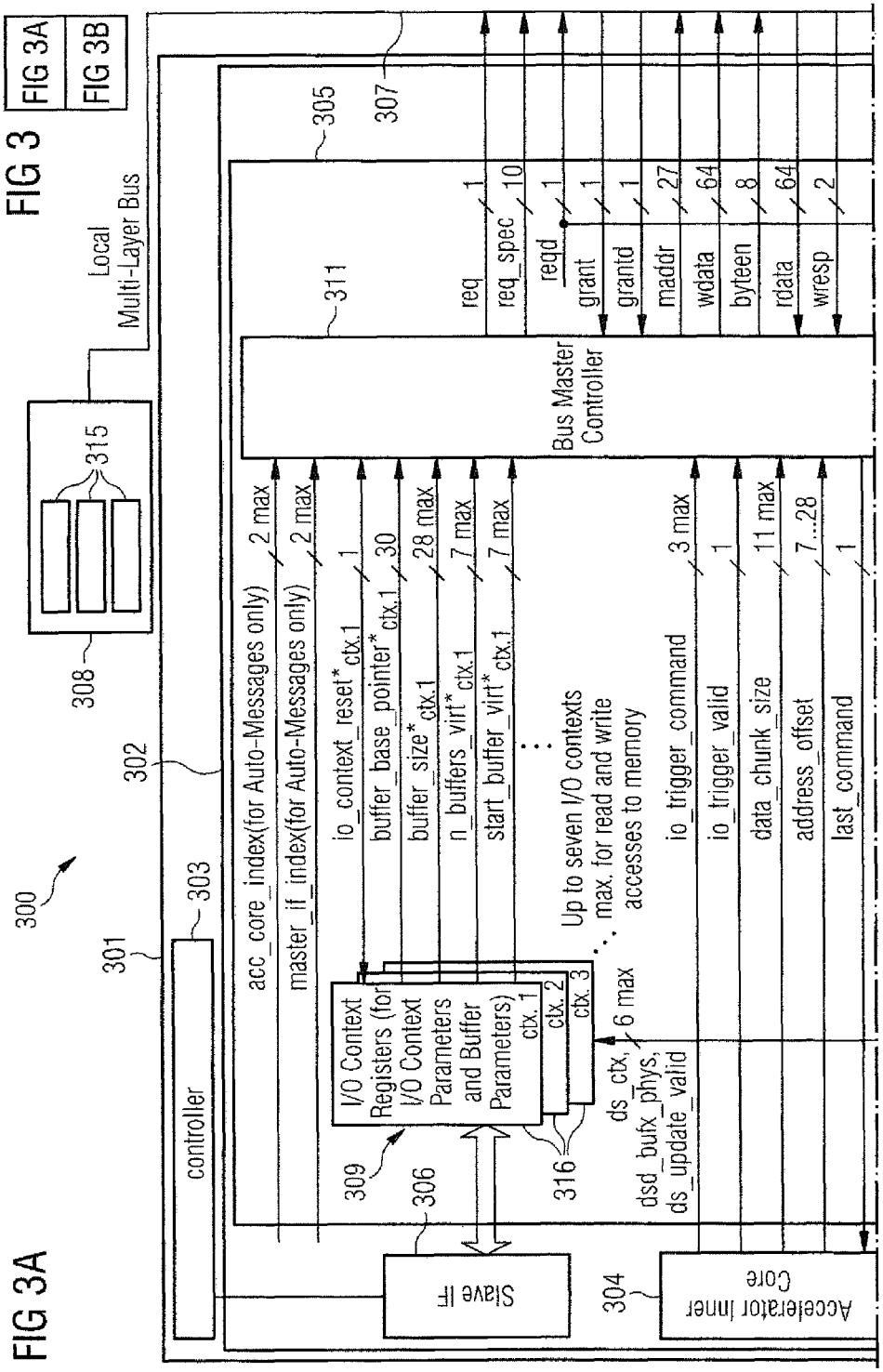

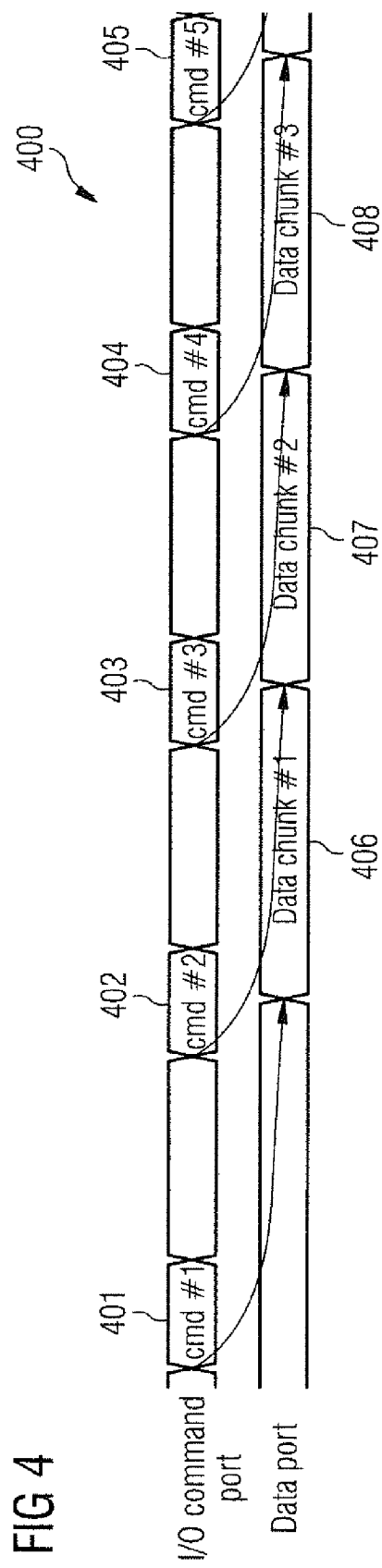

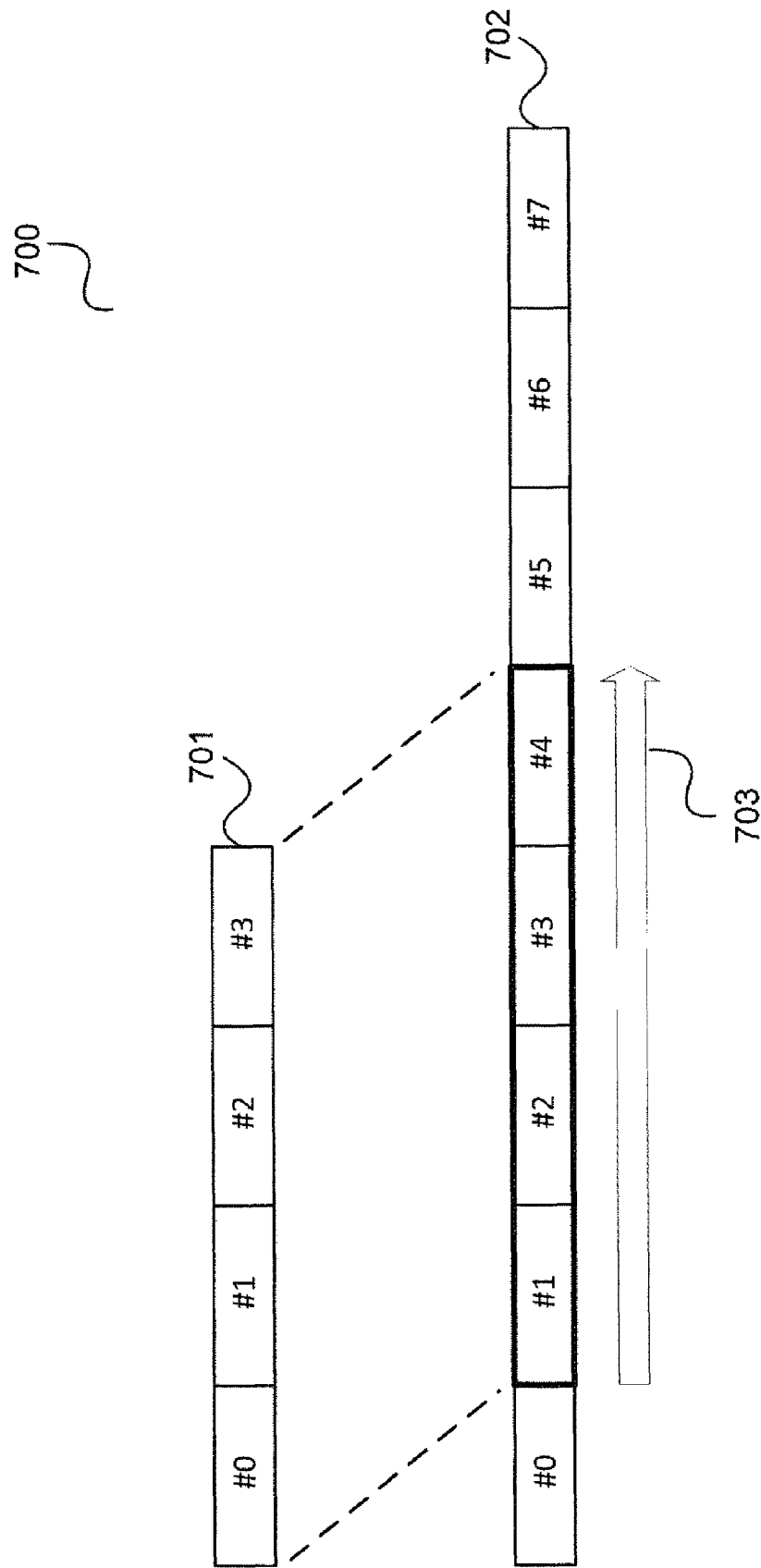

DATA PROCESSING DEVICE AND DATA PROCESSING ARRANGEMENT FOR ACCELERATING BUFFER SYNCHRONIZATION

TECHNICAL FIELD

Embodiments generally relate to a data processing device and a data processing arrangement.

BACKGROUND

In data processing systems, data typically needs to be exchanged between different components, e.g. different processors (e.g. between a central processing unit, CPU, and a co-processor) or also between different processes running on the same processor.

Data may be exchanged between different entities (which may include software processes executed by a processor or hardware components such as a co-processor) by means of writing the data to be exchanged to a memory which may be accessed by all of the entities, i.e. a shared memory.

In such a scenario, mechanisms have typically to be provided for ensuring synchronized access of the data and avoiding data corruption, which may, for example, arise if one entity accesses the shared memory before another entity has finished its access to the shared memory.

Accordingly, mechanisms for controlling access to a memory (e.g. a shared memory used for data exchange) that provide efficient access, e.g. allow fast exchange of data by means of the memory, are desirable.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments are described with reference to the following drawings, in which:

FIGS. 3a and 3b show a data processing device according to an embodiment.

FIG. 4 shows a flow diagram according to an embodiment.

FIG. 7 illustrates a mapping of state information according to an embodiment.

DESCRIPTION

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, logical, and electrical changes may be made without departing from the scope of the invention. The various embodiments are not necessarily mutually exclusive, as some embodiments can be combined with one or more other embodiments to form new embodiments.

In data processing systems, data which is generated by one entity (i.e. a data producing entity, e.g. a hardware component or a process running on a processor) may be needed to be supplied to another entity (i.e. a data consuming entity, e.g. another hardware component or a process running on a processor, possibly the same processor running the data generating entity). It should be noted that the other entity, i.e. the data consuming entity, can also operate as a data producing entity for a third communication partner (i.e. a third entity) or also for the data producing entity such that both entities both operate as data producing entity and as data consuming entity.

Figure 1:
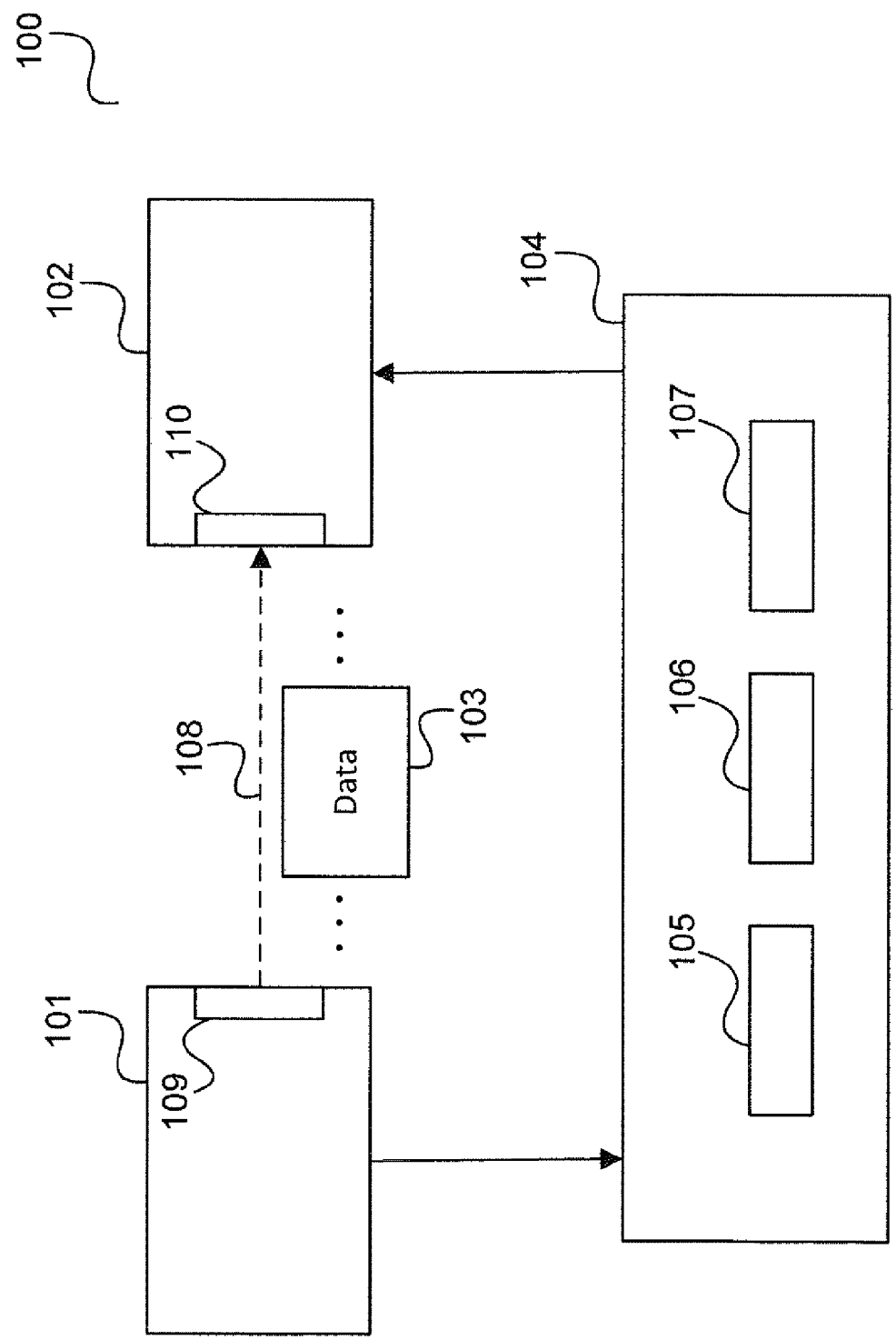
FIG. 1 shows a data processing arrangement according to an embodiment.

This is illustrated in FIG. 1.

FIG. 1 shows a data processing device 100 according to an embodiment.

The data processing device 100 includes a data producing entity 101 (also referred to as a producer) and a data consuming entity 102 (also referred to as a consumer). For example, the data producing entity 101 generates data 103 that is to be processed by the data consuming entity 102. Both entities may be a process running on the same processor or different processors, e.g. of one or two computer systems, or may be different hardware components e.g. a processor and a co-processor etc.

The data 103 may be exchanged between the data producing entity 101 and the data consuming entity 102 by means of a shared memory 104. The data producing entity 101 writes the data 103 into the shared memory 104 and the data consuming entity 102 reads the data 103 from the shared memory 104. The data 103 may, for example, be part of a data stream (as illustrated by the three dots to the left and right of the data 103 in FIG. 1) which is, for example, continuously produced (e.g. generated) by the data producing entity 101 and consumed by the data consuming entity 102.

The shared memory 104 may be seen as implementing a channel 108 between the data producing entity 101 and the data consuming entity 102.

The shared memory 104, for example, includes a plurality of memory regions 105, 106, 107, also referred to as buffers in the following, of the memory 104. Each memory region 105, 106, 107, for example, includes a plurality of storage cells (e.g. for a certain amount of data) of the memory 104.

The layout of the memory regions 105, 106, 107 may be described by an I/O context, which may be seen as a context of the channel 108. The producing entity 101 and the consuming entity 102 may each include an interface 109, 110 associated with this context.

For example, the data producing entity 101 writes data 103 (e.g. part of a data stream) to a first memory region 105 of the memory 104 and the data consuming entity 102 reads the data from the first memory region 105. To avoid that the data consuming entity 102 reads data from a memory region 105, 106, 107 before they have been completely written to the memory region 105, 106, 107 (and thus reads incomplete and thus possibly corrupted data) or that the data producing entity 101 writes new data into the memory region 105, 106, 107 before they have been properly read by the data consuming entity 102, the memory regions 105, 106, 107 may be locked, i.e. access to each memory region 105, 106, 107 may be locked to allow exclusive access by either the data producing entity 101 or the data consuming entity 102.

A plurality of memory regions 105, 106, 107 may be used to allow simultaneous writing of the data producing entity 101 (into one of the memory regions) and reading of the data consuming entity 102 (from another of the memory regions).

The data generating entity 101 and/or the data consuming entity 102 may, for example, be part of a computer system and may be coupled to the memory 104 by means of a system computer bus of the computer system. According to one embodiment, the data producing entity 101 and/or the data consuming entity 102 includes an interface circuit, also referred to as bus master interface by means of which the data 103 is exchanged (e.g. which controls the exchange of the data 103 via the memory 104) and by which synchronization information may be exchanged between the data producing entity 101 and the data consuming entity 102, for example, information for ensuring that a memory region 105, 106, 107 has been written by the data producing entity 101 before it is read by the data consuming entity 102 or vice versa.

A data processing device having components that may form such a bus master interface and/or implement such a bus master interface is described in the following with reference to FIG. 2.

Figure 2:
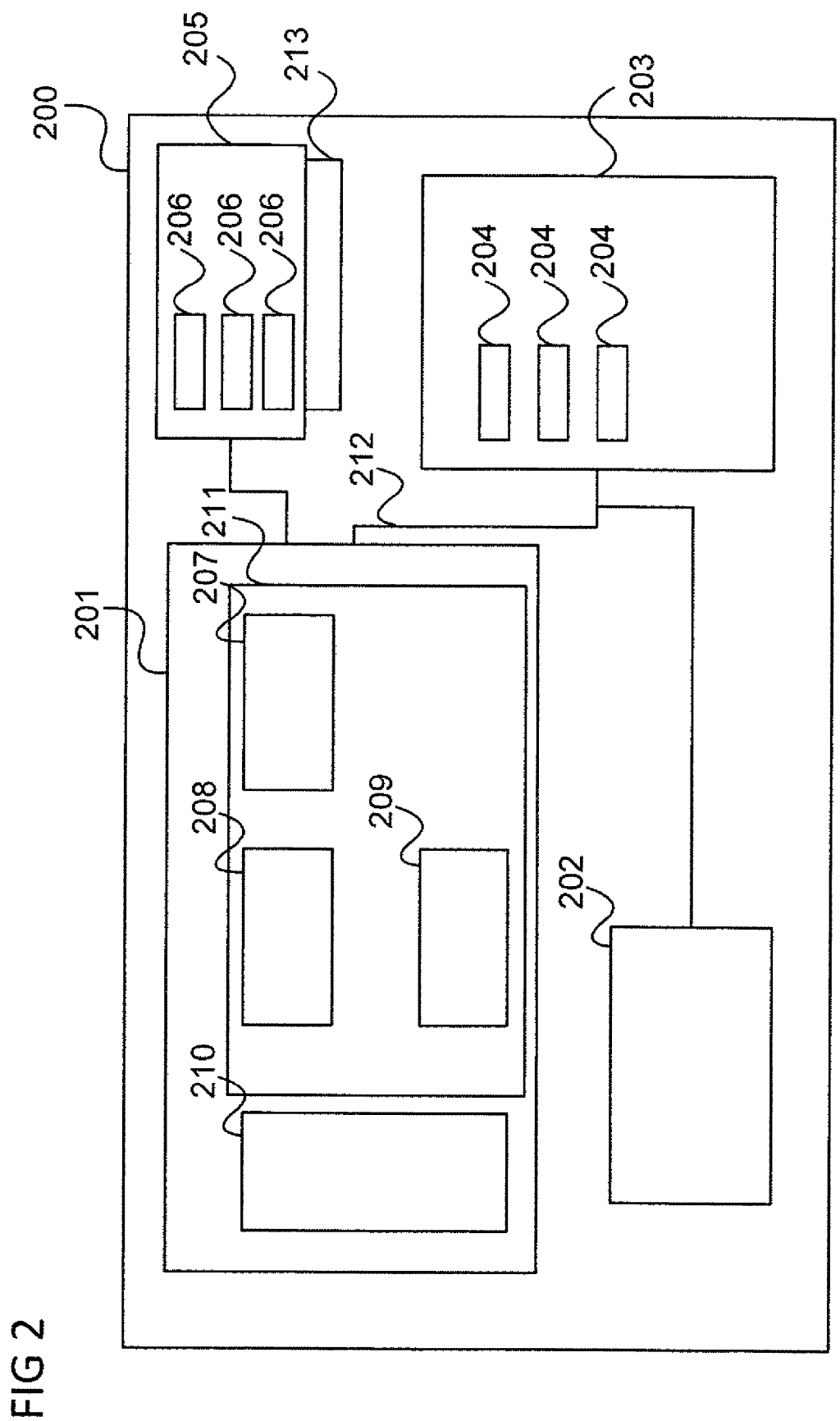
FIG. 2 shows a data processing device according to an embodiment.

FIG. 2 shows a data processing device 200 according to an embodiment.

The data processing device 200 includes a memory 203 including a plurality of memory regions 204, a first data processing component 201 and a control memory 205 including, for each memory region of the plurality of memory regions 204 an indication 206 whether a data access to the memory region 204 may be carried out by the first data processing component 201.

The first data processing component 201 includes a checking circuit 207 configured to check, for a memory region 204, whether a data access to the memory region 204 may be carried out by the first data processing component 201 based on the indication 206 for the memory region 204.

The first data processing component 201 further includes a data access circuit 208 configured to carry out a data access to a memory region of the plurality of memory regions 204 if a data access to the memory region 204 may be carried out by the first data processing component 201.

The first data processing component 201 further includes a setting circuit 209 configured to set the indication 206 for a memory region 204 to indicate that a data access to the memory region 204 may not be carried out by the first data processing component 201 in response to the completion of a data access of the first data processing component 201 to the memory region 204.

The data processing device 200 further includes a second data processing component 202, wherein the second data processing component 202 is configured to set the indication 206 for a memory region 204 to indicate that the first data processing component 201 may carry out a data access to the memory region 204.

The control memory 205 may be part of the first data processing component 201. The control memory 205 may also be part of the second data processing component 202. In case that the control memory 205 is not part of the first data processing component 201, the first data processing component 201 may have stored, e.g. in a memory of the first data processing component 201, a copy of the contents of the control memory 205. In other words, the first data processing component 201 may have a memory whose contents are synchronized with the control memory 205.

It should be noted that the indication that a data access may be carried out to a memory region 204 may in one embodiment also be an indication that the data access is to be carried out to the memory region 204.

Depending on whether the data access by the first data processing component 201 is a write access or a read access, the first data processing component 201 may correspond to the data producing entity 101 (if the data access is a write access) or the data consuming entity 102 (if the data access is a read access). It should be noted that the second data processing component may have an architecture similar to the first data processing component and may correspond to the data producing entity 101 in case the data access is a read access or may correspond to the data consuming entity 102 in case the data access is a write access.

The first data processing component may further include a data processing circuit 210 that is, for example, configured to provide (processed) data that is to be stored in the memory 203 by the data access or that is configured to process data read from the memory 203 by the data access.

The control memory 205, the checking circuit 207, the data access circuit 208, and the setting circuit 209 may be seen to form an interface for the first data processing component 201. The first data processing component 201 may be connected to the memory 203 by means of a computer bus 212 (via which the data access to the memory 203 may be carried out). Accordingly, the interface 211 may be a bus master interface in one embodiment. The first data processing component 201 may be a hardware accelerator of the data processing device 200. Accordingly, the interface 211 is also referred to as accelerator master interface in the following. It should be noted that the first data processing component 201 may include a plurality of such interfaces 211.

According to one embodiment, the memory regions 204 may be seen as data buffers and each data buffer corresponds to a data block (e.g. stored in the respective memory region 204). According to one embodiment, a data block stored in a memory region 204 is read from or written to the memory region 204. In other words, one embodiment may be seen to be based on the concept that data is exchanged in atomic units (the memory regions 204 or the data blocks corresponding to the memory regions 204, respectively) which are synchronized (e.g. in terms of exclusive access by either the first data processing component 201 or the second data processing component 202). These atomic units are referred to as memory regions in the following. The handling of these memory regions may, for example, be facilitated by a controller.

According to one embodiment, in other words, the checking circuit checks whether the first data processing component has an access right to the memory region and the setting circuit, after completion of the data access, releases the access right by setting the indication for the memory region accordingly.

Changes of contents of the control memory 205, e.g. carried out by the setting circuit 209 or by the second data processing element 202 may be signalled to the checking circuit 207 by means of signals/messages, such as interrupts, such that the checking circuit 207 does not need to actively check for changes in the control memory 205, e.g. does not carry out an active polling of the control memory 205. This signalling is, for example, carried out by a signalling circuit 213 that may also be arranged, together with the control memory 205, in the first data processing element 201 or the second data processing element 202.

According to one embodiment, additional parameters may be passed along with the data of the memory regions 204 that is associated with the respective memory region 204 (or, correspondingly, with the data stored in the memory region 204).

According to one embodiment, a hierarchical memory region concept enables an efficient yet flexible implementation of the necessary infrastructure for handling the memory regions 204.

In an embodiment, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below, may also be understood as a "circuit" in accordance with an alternative embodiment.

According to one embodiment, the second data processing component is configured to set the indication for a memory region to indicate that the first data processing component may carry out a data access to the memory region, for example, for instructing the first data processing component to carry out a data access to the memory region.

The first data processing component may further include a memory interface for data exchange with the memory. The memory interface may, for example, be part of the interface 211. For example, it may be part of the data access circuit 208.

The first data processing component is, for example, configured to carry out data accesses to the memory regions in a predetermined order.

In one embodiment, the first data processing component includes an input configured to receive the indication.

For example, the second data processing component is a processor running a software process and wherein the setting of the indication for a memory region to indicate that the first data processing component may carry out a data access to the memory region is initiated by the software process.

In one embodiment, the interface is configured to forward data read from the memory in course of the data access to the data processing circuit 210 or to provide the data to be written to the memory in course of the data access.

The memory regions are, for example, buffers allocated in a shared memory.

The memory regions are for example of equal size.

The data processing device is, for example, a computer.

In one embodiment, the indication that a data access to the memory region may be carried out by the first data processing component is the specification that the data block size of a data block stored in the memory region is bigger than zero.

The indication that no data access to the memory region may be carried out by the first data processing component is, for example, the specification that the data block size of a data block stored in the memory region is zero.

In one embodiment, for at least one memory region, the control memory stores in addition to the indication at least one parameter value according to which the data access is to be carried out or the data stored in the memory region is to be processed by the first data processing component.

The control memory 205 may, for example, be configured to receive the at least one parameter value from the second data processing component. Accordingly, the second data processing component 202 may be configured to generate and provide the at least one parameter value.

It should be noted that the features of the second data processing component 202 may comprise the features of the first data processing component 201 as described above and vice versa. In other words, the data processing device may include two data processing components with the above described features that are communicating with each other.

A data processing device according to one embodiment is described in the following with reference to FIGS. 3a and 3b.

Figure 3B:
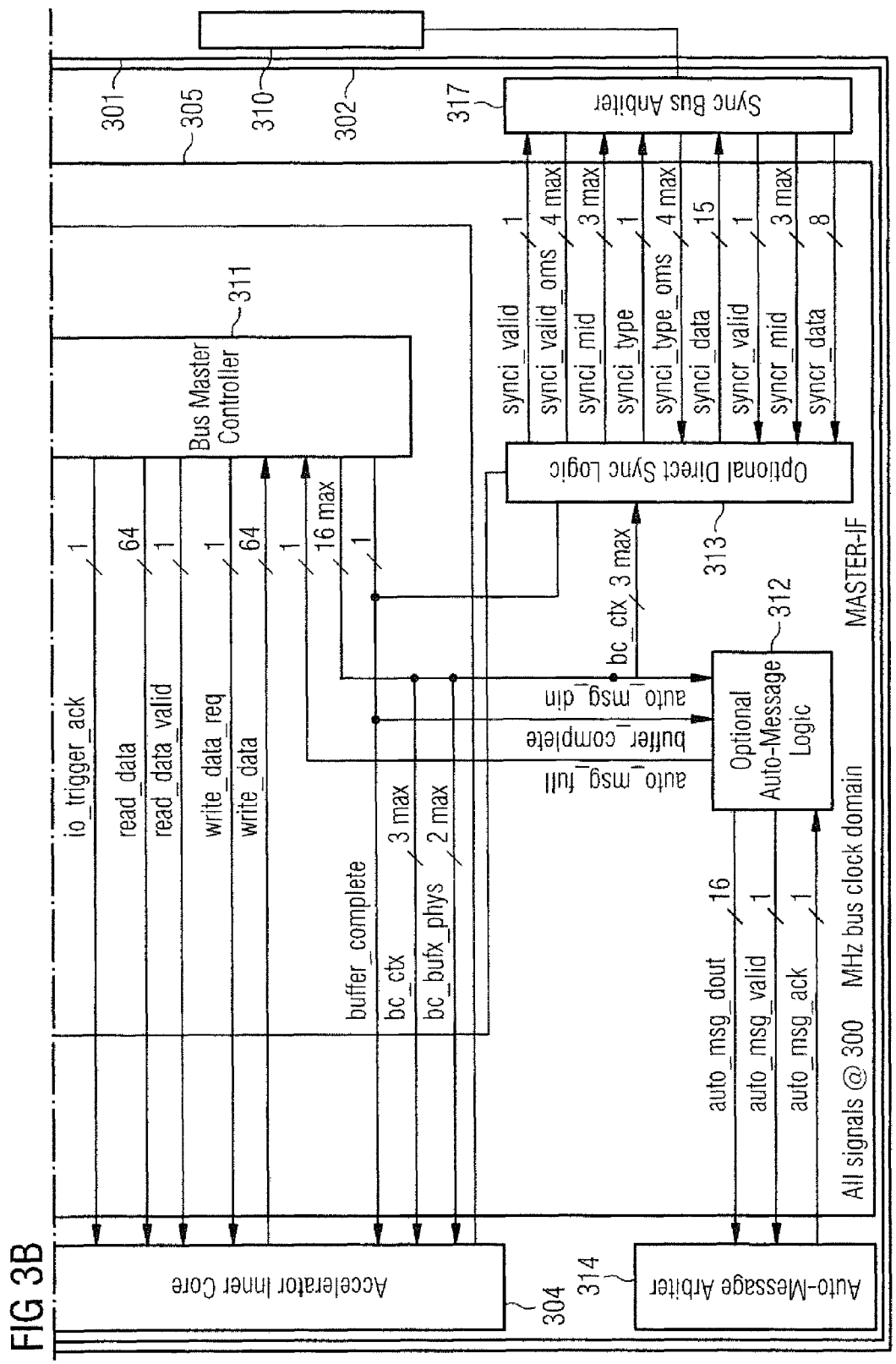

FIGS. 3a and 3b show a data processing device 300 according to an embodiment.

The data processing device 300 includes a hardware accelerator 301 including an accelerator core 302 and a local general purpose controller 303. The accelerator core 302 includes an accelerator inner core 304, a master interface 305 (or, in one embodiment, a plurality of master interfaces) and a slave interface 306. There may be one or more accelerator master interfaces 305 in a single accelerator core 302 in order to meet throughput requirements. Each accelerator master interface 305 connects the accelerator inner core 304 to a system bus 307 of the data processing device 300 (e.g. a computer system).

A memory 308 of the data processing device 300 is connected to the system bus 307.

The accelerator slave interface 306 connects the accelerator inner core 304 to the local general purpose controller 303.

The bus master interface 305 may include a plurality of registers 309 that may, in the register transfer level (RTL) implementation, be part of the accelerator slave interface 306.

In one embodiment, the data processing device also includes a central synchronization hardware 310.

The accelerator master interface is used for read and write accesses (in one embodiment all read and write accesses) of the accelerator core 302 to the memory 308 (which may include one or more shared memory devices) and for sending messages over the system bus 307 to software components of the data processing device 300. It may also support data synchronization with other hardware components or software components of the data processing device 300.

The accelerator master interface 305 may be seen as a configurable generic macro which can be used as bus master interface in a plurality (even all) of hardware accelerator cores 302 of the computer system. The generic parameters can be adjusted individually per accelerator master interface instance and may be fixed after synthesis. All other parameters may be defined by software at run-time.

The accelerator master interface 305 includes a multi-threaded bus master controller 311, optionally additional logic for memory region synchronization including an auto-message circuit 312 and a direct sync circuit 313 and the set of dedicated registers of the plurality of registers 309. The auto-message circuit 312 is, for example, connected to an auto-message arbiter circuit 314 of the data processing device 300.

The accelerator master interface 305 has several ports connecting the accelerator master interface 305 to the accelerator inner core 304, the auto-message arbiter circuit 314 which is connected to the message queue of the local general purpose controller 303, the system bus 307, and the central synchronization hardware 310 of the data processing device 300.

The accelerator 302 may, for example, be connected via the following signals and connections to the system bus 307:

req: Used by the bus master controller 311 to request access to the system bus 307.

req_spec: Used by the bus master controller 311 to specify the type of access to the system bus 307. This signal carries the block address, the cluster address and the read/write indicator in the cycle where req is asserted. In the cycle succeeding the request it carries the burst length.

reqd: Enables the request for each single data phase of a burst transaction. This is essential when a burst that has already been started shall be stalled.

grant: Used to signal to the bus master controller 311 that access to the system bus 307 has been granted.

grantd: Grants the read data bus lane rdata or write data bus lane wdata to the requesting master (in this case the bus master controller 311) and defines the cycle at which the data appears on the bus.

maddr: Used for specifying a memory address of the memory 308 wdata: Used by the bus master controller 311 to transfer data to be written into the memory 308 onto the system bus 307 byteen: Used by the bus master controller 311 to activate a part of the memory 308.

rdata: Used for transfering data that has been read from the memory 308 over the system bus 307 to the bus master controller 311.

wresp: Signals the completion of a write transfer.

The accelerator inner core 304 and the bus master controller 311 communicate, for example, via the following signals and connections:

io_trigger_command: Used by the accelerator inner core 304 to initiate an input output (I/O) operation by the bus master controller 311 (e.g. data access such as a write access or a read access to the memory 308).

io_trigger_valid: Used by the accelerator inner core 304 to signal that the initiation signal for an I/O operation is valid.

data_chunk_size: Used by the accelerator inner core 304 to indicate the amount of data that is to be input or output in course of an initiated I/O operation, i.e. the size of a data burst.

address_offset: Used by the accelerator inner core 304 to specify an offset within a memory region 315 at which the data to be input or output start within the memory region. In one embodiment, in the case of system bus messages this signal may be used for message data.

last_command: Indicates that the current I/O command is the last I/O command for the current memory region.

io_trigger_ack: Used by the bus master controller 311 to acknowledge the initiation (i.e. the trigger) of an I/O operation.

read_data: Used by the bus master controller 311 to transfer data read from the memory 308 to the accelerator inner core 304.

read_data_valid: Used by the bus master controller 311 to indicate that data transfered via read_data is valid.

write_data_req: Used by the bus master controller 311 to request data that is to be written in an I/O operation to the memory 308 from the accelerator inner core 304.

write_data: Used by the accelerator inner core 304 to transfer data to the bus master controller 311 which is to be written to the memory 308.

The accelerator inner core 304, the bus master controller 311, the auto-message circuit 312 and the direct sync circuit 313 may, for example, communicate via the following signals and connections:

buffer_complete: Used by the bus master controller 311 to indicate that the final I/O operation regarding a memory region 315 (e.g. the writing of data to the memory region 315 or the reading of data from the memory region 315) has been completed.

bc_ctx: Index of the I/O context the current buffer_complete signal is intended for.

bc_bufx_phys: Index of the parameter register set in control memory the current buffer_complete signal is intended for.

auto_msg_full: Used by the auto-message circuit 312 to indicate that its buffer for auto-messages to be sent is full.

auto_msg_din: Used to signal to the auto-message circuit 312 the contents of an auto-message to be sent by the auto-message circuit 312.

There may be up to eight (or in other embodiments any number of) configurable I/O contexts for using different I/O modes (e.g. streaming mode or random access mode), different I/O directions and a variety of other differing parameters within the same instance of the accelerator master interface 305, among which is a special I/O context for sending system bus messages. It should be noted that such I/O contexts may be defined for each instance of an accelerator master interface 305 in the data processing system 301 in case of a plurality of accelerator master interfaces 305 in the data processing system 301.

Each I/O context is represented by a set of parameters describing the properties of that I/O context. While some of these parameters may be fixed at design time of the accelerator master interface 305, others may be configured at run-time. I/O context parameters configurable at run-time as well as memory region parameters are mapped to a set of register fields of the registers 309, which are writable either by software, i.e. by the local general purpose controller 303 of the accelerator 301 through the slave interface 306 of the accelerator core 302, or by hardware, i.e. by the accelerator inner core 304 or by the accelerator master interface 305. For example, the registers 309 include a set of registers 316 for each I/O context defined for the accelerator 302. A set of registers 316, for example, includes I/O context registers which include the register fields storing the I/O context parameters and registers for storing memory region parameters for this I/O context.

It should be noted that in the register transfer level (RTL) implementation, as already mentioned for the registers 309, the I/O context registers may be part of the accelerator slave interface model.

The I/O contexts may be used concurrently, so that even a single accelerator core 302 with only a single instance of the accelerator master interface 305 can handle multiple input and output data transfers at the same time, in an interleaved manner. This is illustrated in FIG. 4.

FIG. 4 shows a flow diagram 400 according to an embodiment.

In this example, the bus master controller 311 executes three threads numbered 0, 1, and 2, wherein each thread uses its own I/O context defined by the I/O context registers of the set of registers 316 for this I/O context.

The diagram 400 illustrates the data flow on the I/O command port of the bus master controller 311 (including, for example, the connection io_trigger_command etc.) and the data flow on the data port of the bus master controller 311 (including, for example, the connections wdata, rdata etc. to the system bus 307).

Via the I/O command port, five commands 401, 402, 403, 404, and 405 are given to the bus master controller 311.

According to a first command 401, first data 406 is to be read from/written to the memory 308. According to a second command 402, second data 407 is to be read from/written to the memory 308. According to a third command 403, third data 408 is to be read from/written to the memory 308.

In this example, the first command 401 and a fourth command 404 are processed by bus master thread 0, the second command 402 and a fifth command 405 are processed by bus master thread 1, and the third command 403 is processed by bus master thread 2.

As illustrated, the data 406, 407, 408 is communicated serially via the data port. The processing of the commands 401-405 by different threads, for example, allows that the second command 402 is received by the bus master controller 305 even before the first data 406 have been communicated over the data port. Communication between the registers 309 and the bus master controller 311 is, for example, carried out using the following signals and connections.

io_context_reset: Used for resetting the I/O context.
buffer_base_pointer: Used for specifying the start address of the first memory region 315 in memory 308 for this I/O context.
buffer_size: Used for specifying the size of a memory region 315.
n_buffers_virt: Used for specifying the number of memory regions 315.
start_buffer_virt: Used for specifying the memory region 315 for which processing is to be started (e.g. in a sequential processing of the memory regions 315).

These signals and connections are, for example, present for each I/O context.

According to one embodiment, as mentioned above, a data synchronization concept is used based on memory regions 315 in shared memory 308. Generally, according to one embodiment, the synchronization of a data producing entity (e.g. process) 101 and a data consuming entity (e.g. process) 102 is based on the partitioning of the data 103 into data blocks, which are stored in memory regions in shared memory.

The usage of memory regions 315 for data synchronization is explained in more detail with reference to FIG. 5.

Figure 5:
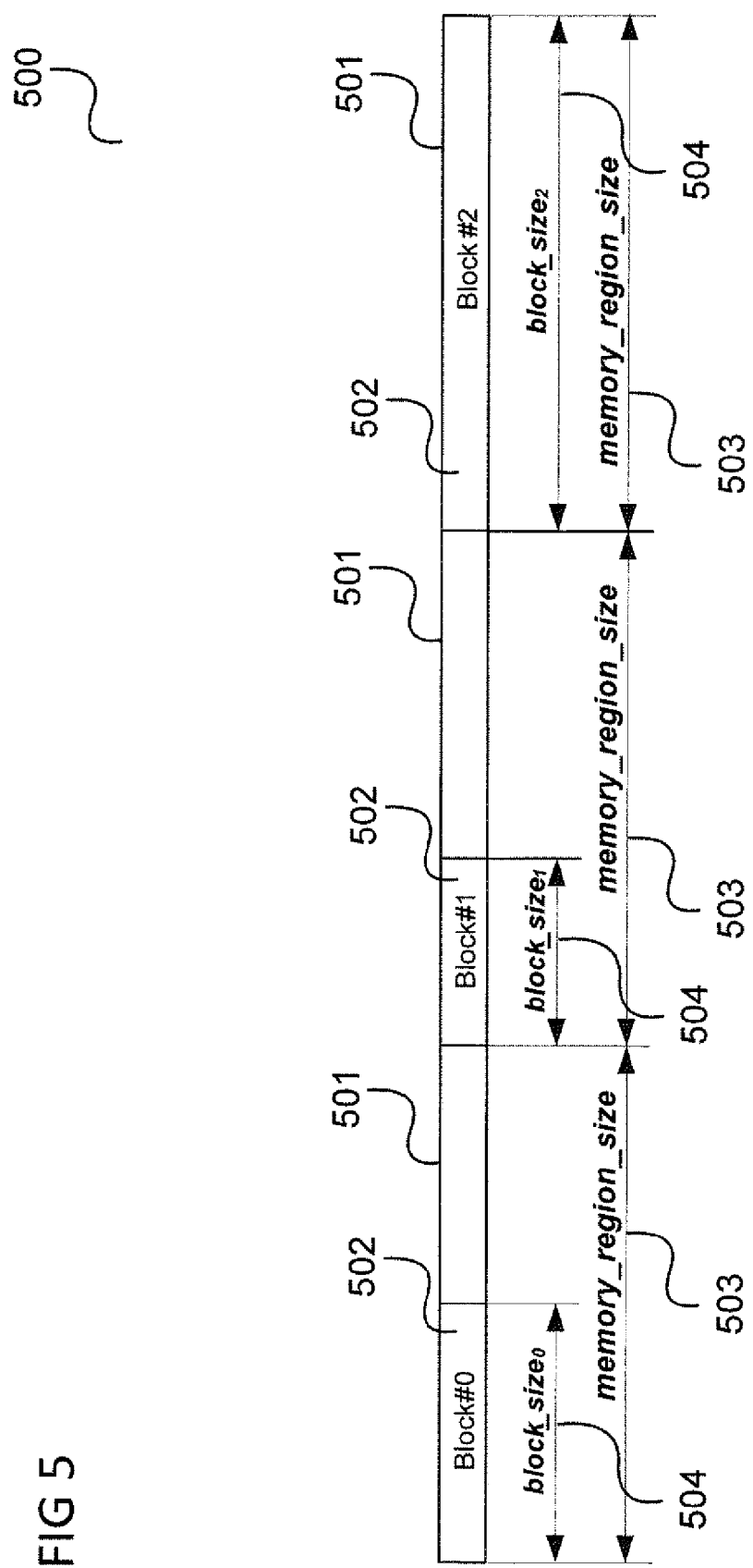
FIG. 5 shows a memory according to an embodiment.

FIG. 5 shows a memory 500 according to an embodiment.

The memory 500, for example, corresponds to the memory 308 of the data processing device 300.

The memory 500 includes a plurality of memory regions 501 wherein each memory region stores a data block 502. The memory regions 501, for example, have a size memory_region_size 503 which may be equal for all memory regions 501.

Each data block 502 is thus stored in a separate shared memory region 501 wherein the data block sizes 504 are in each case less than or equal to the memory region size 503.

A memory region 501 is always accessible for only one component of the data processing device 300 at a time, regardless of the access being a read access, a write access or a mixed read and write access. The component that is currently given access to the memory region 501 is also referred to as the owner of the memory region 501. It may either be a hardware component or a software component of the data processing device 300.

For controlling the ownership of a specific memory region 501, a common data synchronization concept is used according to one embodiment. This data synchronization concept is based on a parameter denoted as block_size that is stored by a component for each memory region 501. This parameter is used according to the following rules:
block_size>0: Only the component has read/write access to the memory region and all of its parameters.
block_size=0: Only another component has read/write access to the memory region and all of its parameters.

This means that as long as the block_size parameter of that memory region is greater than zero, the component may read or write the memory region. No access by another component is allowed at that time. As soon as the component zeroes the block_size parameter (i.e. sets it to zero), the other component again has access to the memory region.

In case of the data processing device 300, the block_size parameter is, for example, stored for each memory region 315 in a block_size parameter register of the registers 309 for the memory region 315. For example, the block_size parameter may be stored in a block_size parameter register of the set of registers 316 for the I/O context in which the memory region 315 is used (i.e. in which the memory region 315 is accessed, e.g. in which data is written into the memory region 315 or in which data is read from the memory region 315).

The block_size parameter may, for example, be written directly or indirectly by the local general purpose controller 303. For example, the controller 303 may directly write the block_size parameter into a block_size parameter register of the registers 309 for the memory region 315. For the indirect case, the controller 303 may always write to the same register of the registers 309 (e.g. in terms of the register address) which is automatically mapped (e.g. by special circuitry) to the block_size parameter register of the memory region 315.

The value of the block_size parameter may be polled directly or indirectly by the local general purpose controller 303. For example, the controller 303 may directly poll (e.g. read) the block_size parameter register of the memory region 315.

For the indirect case, the controller 303 may always poll the same register which is automatically mapped (e.g. by special circuitry) to the block_size parameter register of the memory region 315.

According to one embodiment, additional memory region parameters may be stored in the registers 309 for each memory region 315.

For example, additional memory region parameters for a memory region 315 reside in additional memory region parameter registers of the registers 309 of the accelerator core 302 directly following the block_size parameter register for the memory region 315. Additional memory region parameters may be optional, whereas the block_size parameter may be mandatory in one embodiment. Number and purpose of the additional memory region parameters may be defined individually for each I/O context (of each accelerator 301 if the data processing device includes more than one) at design time. The memory region parameter registers may also be used for (optional) memory region return values, which may again be defined at design time.

An additional memory region parameter may, for example, specify how the data stored in a memory region 315 is to be processed (e.g. may specify a function to be carried out on the data etc.). An additional memory region parameter may, for example, also specify that a memory region 315 is to be read another time. For example, memory regions 315 have in one embodiment an ordering and are accessed (read or written) according to this ordering subsequently. An additional memory region parameter may, for example, be a data repetition bit by which it may be specified that a memory region 315 is to be accessed two times in a row.

A memory region return value for a memory region 315 may, for example, be set by the accelerator core 302 after processing the data block stored in the memory region 315. For example, a memory region return value may specify that a CRC (cyclic redundancy check) on the data has been successful.

The accessibility of the additional memory region parameters by a component may be controlled by the block_size parameter similarly to the memory region access:
block_size>0: Only the component having the additional memory region parameter registers has read/write access to the memory region and all of its parameters.
block_size=0: Only another component has read/write access to the memory region and all of its parameters.

According to one embodiment, a hierarchical memory region concept is employed. This is illustrated in FIG. 6.

Figure 6:
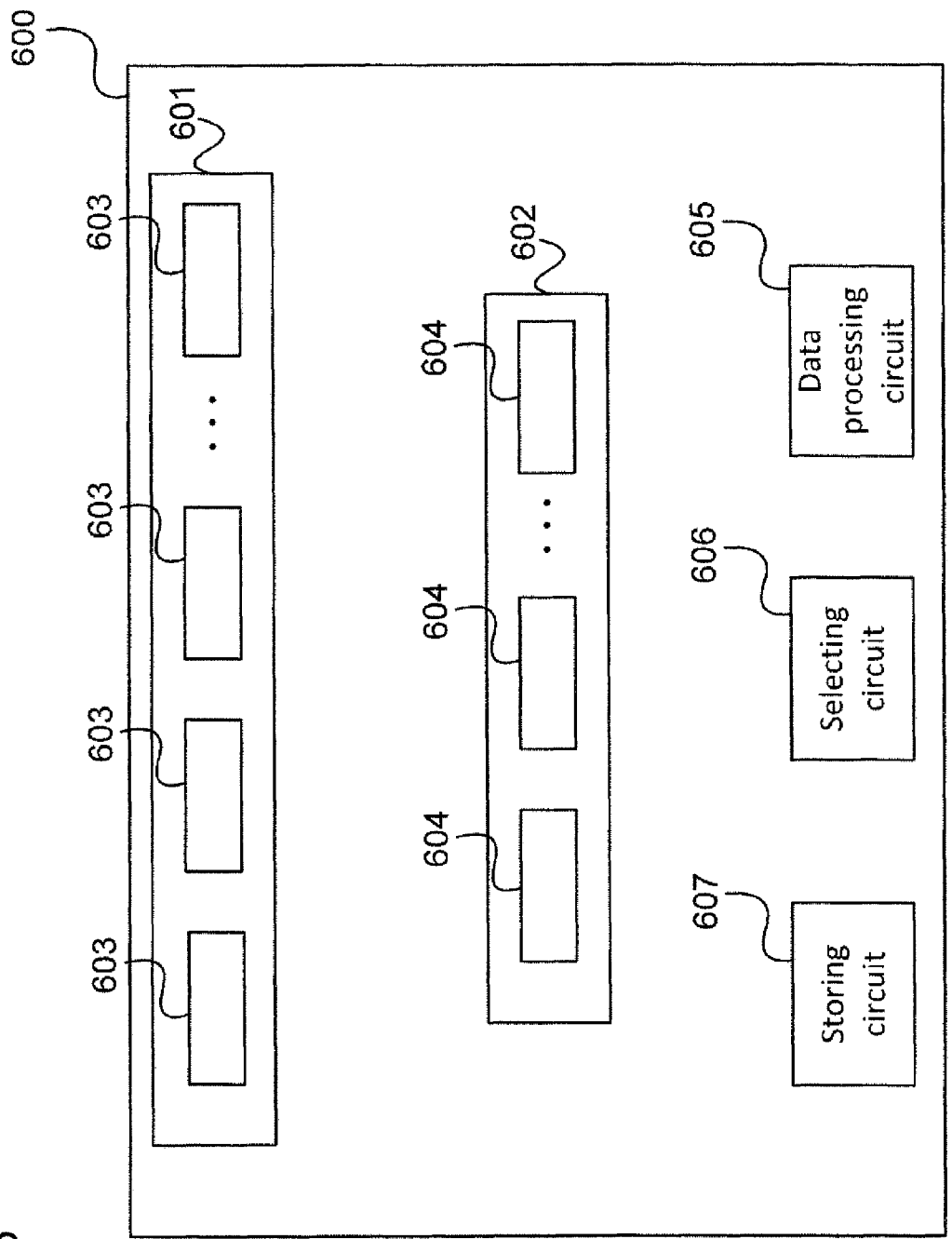
FIG. 6 shows a data processing arrangement.

FIG. 6 shows a data processing arrangement 600.

The data processing arrangement 600 includes a first memory 601 including a plurality of data objects 603. The data objects, for example, correspond to the memory regions 315 of the data processing device 300.

The data processing arrangement 600 further includes a second memory 602 including a plurality of data storage units 604 wherein the number of data storage units 604 is lower than the number of data objects 603. The memory 602, for example, corresponds to the registers 309.

The data processing arrangement 600 further includes a data processing circuit 605 configured to access the plurality of data storage units 604 for state information about the plurality of data objects 603. The state information may, for example, correspond to the block_size parameter values for the memory regions 315. Thus, the data processing arrangement 600, for example, corresponds to the bus master controller 311 accessing the block_size parameter in the registers 309.

According to one embodiment, the data processing arrangement 600 includes a selecting circuit 606 configured to select a data object 603 according to a predetermined rule and a storing circuit 607 configured to store state information about the selected data object 603 in a data storage unit 604.

The selecting circuit may be configured to select the data object according to an ordering of the data objects.

It should be noted that the data processing circuit 605, the selecting circuit 606, and the storing circuit 607 do not necessarily have to correspond to the data access circuit 208, the checking circuit 207, and the setting circuit 209 of the data processing device 200. However, the data processing circuit 605, the selecting circuit 606, and the storing circuit 607 may, for example, be part of the first data processing component 201, e.g. be part of the interface 211.

The state information is, for example, an access right to the data object and the data object is, for example, a memory region of a memory.

In other words, in one embodiment, only a subset of the complete state information (e.g. a subset of the block_size parameter values for all memory regions 315) is mapped to the data storage units 604 of the second memory 602 (e.g. of the registers 309 of the accelerator core 305).

For example, in case of the data processing device 300, two layers of memory region indices are used which allows a high total memory region count for a single I/O context wherein one layer of memory region indices identify the memory regions and the other layer of memory region indices identify memory region parameter sets (e.g. each memory region parameter set for a memory region including the block_size memory region parameter and the additional parameters for the memory region) of the registers 309.

The complete sets of state information may be seen as virtual parameter sets and the data storage units 604 correspond to the (physical) parameter sets resident in control memory. The indices in a first layer, memory region layer 0, for example, address the parameter sets in control memory while the indices in a second layer, memory region layer 1, address the virtual parameter sets. This is illustrated in FIG. 7.

FIG. 7 illustrates a mapping of state information according to an embodiment.

In the illustration of FIG. 7, there are a number of 4 memory region parameter sets in control memory 701 numbered from 0 to 3 and a number of 8 memory regions 702 numbered from 0 to 7.

In other words, there are only four memory region parameter sets in an I/O context physically available in the registers 309 (e.g. a register file). For only four of the memory regions 702 its own memory region parameter set (e.g. including the block_size parameter and additional memory region parameters) is thus part of the registers 309.

The number of memory regions 702 corresponds to the total memory region count in an I/O context and does not need to be a whole-numbered multiple of the number of parameter sets in control memory 701. The number of memory regions 702 is, for example, programmable by software. It also may vary from I/O context to I/O context.

The first memory region layer, memory region layer 0, may represent a sliding window covering 4 memory regions. In other words, the memory region parameter sets in control memory 701 include the parameters of four of the memory regions 702 according to a sliding window, e.g. with a sliding direction as indicated by arrow 703 in the direction of increasing memory region 702 numbers. Thus, the parameter sets in control memory 701 include the parameters for four of the memory regions 702 wherein these four memory regions 702 change according to the "sliding window".

For memory region layer 1, the accelerator master interface 305 only keeps track of the current memory region index of the memory region 315 to which the next data access is to be carried out and calculates the start address of the next memory region to be used (i.e. to be accessed) in memory 308. In one embodiment, no additional hardware effort is necessary for memory region layer 1. All memory region parameters for memory regions that currently are not covered by the sliding window (according to the current mapping, e.g. the position of the sliding window) may be implicitly defined (e.g. may have default values) or may be stored by means of software variables.

According to one embodiment, automatic messages may be used for signaling completion of data access to a memory region to the local general purpose controller 303 over a dedicated message port. These automatic messages, also called Auto-Messages herein, are, for example, local messages and are, for example, not messages sent over the system bus 307 of the data processing device 300. The Auto-Message feature, if implemented, may be switched on or off per I/O context by software, e.g. by using a control bit in the registers 309 of the accelerator core 302.

When an Auto-Message is to be sent, the auto-message circuit 312 of the accelerator master interface 305 generates an Auto-Message data word, for example, including:

Accelerator core index (used for identifying the accelerator core 302 in case of a plurality of accelerator cores in the hardware accelerator 301)

Accelerator master interface index (used for identifying the accelerator master interface 305 in case of a plurality of accelerator master interfaces in the accelerator core 302)

I/O context index (used for identifying the I/O context)

Memory region index

Index of the memory region parameter set in control memory

A generated Auto-Message is transmitted to the Auto-Message arbiter (e.g. via a corresponding accelerator master interface). The Auto-Message arbiter 314 may be arranged between the accelerator core 302 (or the accelerator cores 302) and the local general purpose controller 303 for Auto-Message delivery to software. For example, when two or more master interfaces 305 want to send an Auto-Message at the same time, the Auto-Message arbiter follows a round-robin scheme.

The Auto-Message circuit 312 may, for example, communicate with the Auto-Message arbiter 314 by means of the following connections and signals:

auto_msg_dout: Used by the Auto-Message circuit 312 to transmit an Auto-Message to be sent.

auto_msg_valid: Used by the Auto-Message circuit 312 to indicate that an Auto-Message transmitted to the Auto-Message arbiter 314 is valid.

auto_msg_ack: Used by the Auto-Message arbiter 314 to acknowledge the receipt of an Auto-Message from the Auto-Message circuit 312.

Further, the following signals and connections may be used to communicate with the bus master controller 311 in context of Auto-Messaging:

acc_core_index: Used for addressing the accelerator core 302 in context of Auto-Messaging.

master_if_index: Used for addressing the master interface 305 in context of Auto-Messaging.

According to one embodiment, the accelerator master interface 305 has a port for connection to the central synchronization hardware 310 of the data processing device 300 which in the example shown in FIG. 3a or 3b is formed by the direct sync circuit 313 and a sync bus arbiter circuit 317. The direct sync circuit 313 may be used for autonomic memory region synchronization which is referred to as Direct Sync in the following.

Direct Sync may include writing preconfigured block_size parameter values to the registers 309 without any per-memory-region interaction of the local general purpose controller 303. The accelerator inner core 304 may not be able to tell whether a block_size parameter value has been written by hardware (i.e. by Direct Sync functionality) or by software (or by controller 303).

The preconfigured value of the block_size parameter may, for example, always be written to the block_size register of the next memory region parameter set in control memory to be configured for the respective I/O context. The index of this parameter set in control memory may, for example, be generated using a counter.

The Direct Sync feature, if implemented, may be switched on or off per I/O context by software, e.g. using a control bit in the slave registers of the accelerator core.

The direct sync circuit 313 and the sync bus arbiter circuit 317 may, for example, communicate using the following signals and connections.

synci_valid (Synchronization initiator valid): When activated, this signal indicates a valid entry on the initiator channel.

synci_valid_oms (Initiator valid signal from the other masters of the layer): When activated, this signal from a higher prioritized master disables the output of an initiation word. One bit per other accelerator master interface instance using Direct Sync, one bit for the local controller.

synci_mid: ID of the initiating master. The mapping is to be defined by the use of generic parameters.

synci_type (Initiation word type):

0: 1st cycle of access initiation: address, read/write indication

1: 2nd cycle of write initiation: write data synci_type_oms (Initiation word type from the other masters of the layer): A 1 from a master indicates a write data phase, which shouldn't be divided from the address phase. This disables the output of an initiation word, even when higher prioritized. One bit per other accelerator master interface instance using Direct Sync, one bit for the local controller.

synci_data (Initiator data): Initiation word, multiplexed address (14 bits, including 3 bits for coding the agent function), read/write indicator (1 bit) and write data (8 bits). The two phases of a write transaction are always transmitted back-to-back.

syncr_valid (Synchronization response valid): The activated signal indicates a valid entry on the response channel.

syncr_mid (Master ID of the response receiver): The master only accepts responses which are appropriately addressed. The mapping is to be defined by the use of generic parameters.

syncr_data (Read data): On write accesses the content doesn't care. Not connected internally in the accelerator master interface. Specified for compatibility reasons only.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A data processing device comprising:
a memory comprising a plurality of memory regions;
a first data processing component;
a control memory comprising, for each memory region of the plurality of memory regions, an indication whether a data access to the memory region may be carried out by the first data processing component; and
a second data processing component;
wherein the first data processing component comprises
a checking circuit configured to check, for a memory region, whether a data access to the memory region may be carried out by the first data processing component based on the indication for the memory region;
a data access circuit configured to carry out the data access to the memory region if a data access to the memory region may be carried out by the first data processing component; and
a setting circuit configured to reset the indication for the memory region to indicate that a data access to the memory region may not be carried out by the first data processing component in response to the completion of the data access of the first data processing component to the memory region;
wherein the indication that a data access to the memory region may be carried out by the first data processing component is the specification that the data block size of a data block stored in the memory region is bigger than zero.

2. The data processing device of claim 1, wherein the first data processing component further comprises a memory interface for data exchange with the memory.

3. The data processing device of claim 1, wherein the first data processing component is configured to carry out data accesses to the memory regions in a predetermined order.

4. The data processing device of claim 1, wherein the first data processing component comprises an input configured to receive the indication.

5. The data processing device of claim 1, wherein the second data processing component is a processor running a software process and wherein the setting of the indication for a memory region to indicate that the first data processing component may carry out a data access to the memory region is initiated by the software process.

6. The data processing device of claim 1, wherein the first data processing component further comprises a data processing circuit and an interface configured to forward data read from the memory in course of the data access to the data processing circuit or to provide data to be written to the memory in course of the data access.

7. The data processing device of claim 1, wherein the memory regions are buffers allocated in a shared memory.

8. The data processing device of claim 1, wherein the memory regions are of equal size.

9. The data processing device of claim 1, being a computer.

10. The data processing device of claim 1, wherein the indication that no data access to the memory region may be carried out by the first data processing component is the specification that the data block size of a data block stored in the memory region is zero.

11. The data processing device of claim 1, wherein, for at least one memory region, the control memory stores in addition to the indication at least one parameter value according to which the data access is to be carried out or the data stored in the memory region is to be processed by the first data processing component.

12. The data processing device of claim 11, wherein the control memory is configured to receive the at least one parameter value from the second data processing component.

13. The data processing device of claim 1, wherein the second data processing component is configured to set the indication for a memory region to indicate that the first data processing component may carry out a data access to the memory region.

14. A data processing component of a data processing device, the data processing component comprising:
a control memory comprising, for each memory region of a plurality of memory regions, an indication whether a data access to the memory region may be carried out by the data processing component;
a checking circuit configured to check, for a memory region, whether a data access to the memory region may be carried out by the data processing component based on the indication for the memory region;
a data access circuit configured to carry out the data access to the memory region if a data access to the memory region may be exclusively carried out by the data processing component;
a setting circuit configured to reset the indication for a memory region to indicate that a data access to the memory region may not be carried out by the data processing component in response to the completion of the data access of the data processing component to the memory region;
wherein the indication that a data access to the memory region may be carried out by the data processing component is the specification that the data block size of a data block stored in the memory region is bigger than zero.

15. A data processing arrangement comprising:
a first memory comprising a plurality of data objects;
a second memory comprising a plurality of data storage units wherein the number of data storage units is lower than the number of data objects;
a data processing circuit configured to access the plurality of data storage units for state information about the plurality of data objects;
a selecting circuit configured to select a data object from the plurality of data objects according to a predetermined rule;
a storing circuit configured to store state information about the selected data object in a data storage unit of the plurality of data storage units;
wherein the state information is an access right to a data object, and the state information that a data access to a data object may be carried out by the data processing circuit is the specification that the data block size of a data block stored in the data object is bigger than zero.

16. The data processing arrangement of claim 15, wherein the selecting circuit is configured to select the data object according to an ordering of the data objects.

17. The data processing arrangement of claim 15, wherein the data object is a memory region of a memory.

18. A data processing device comprising:
a memory comprising a plurality of memory regions;
a first data processing component;
a control memory comprising, for each memory region of the plurality of memory regions, an indication whether a data access to the memory region may be carried out by the first data processing component; and
a second data processing component;
wherein the first data processing component comprises
a checking circuit configured to check, for a memory region, whether a data access to the memory region may be carried out by the first data processing component based on the indication for the memory region;
a data access circuit configured to carry out the data access to the memory region if a data access to the memory region may be carried out by the first data processing component; and
a setting circuit configured to reset the indication for the memory region to indicate that a data access to the memory region may not be carried out by the first data processing component in response to the completion of the data access of the first data processing component to the memory region;
wherein the indication that no data access to the memory region may be carried out by the first data processing component is the specification that the data block size of a data block stored in the memory region is zero.

* * * * *